US012455558B2

(12) United States Patent
Maij et al.

(10) Patent No.: US 12,455,558 B2
(45) Date of Patent: Oct. 28, 2025

(54) MANUFACTURING FACILITY AND MANUFACTURING METHOD

(71) Applicant: AM-Flow Holding B.V., Amsterdam (NL)

(72) Inventors: Gideon Daniel Maij, Amsterdam (NL); Nick De Zwart-Janssen, Eindhoven (NL); Jonathan Van Der Spek, Amsterdam (NL); Stefan Rink, Sterksel (NL); Yueting Liu, Amsterdam (NL); Reinder Alexander Lambertus Koelstra, Amsterdam (NL)

(73) Assignee: AM-Flow Holding B.V., Amsterdam (NL)

( * ) Notice: Subject to any disclaimer, the term of this patent is extended or adjusted under 35 U.S.C. 154(b) by 597 days.

(21) Appl. No.: 17/851,582

(22) Filed: Jun. 28, 2022

(65) Prior Publication Data

US 2022/0413475 A1 Dec. 29, 2022

(30) Foreign Application Priority Data

Jun. 29, 2021 (EP) .................................... 21182442

(51) Int. Cl.
*G05B 19/418* (2006.01)
(52) U.S. Cl.
CPC ................. *G05B 19/41865* (2013.01); *G05B 2219/32252* (2013.01)
(58) Field of Classification Search
CPC .... G05B 19/41865; G05B 2219/32252; G05B 19/41875; G05B 2219/32237; Y02P 90/02

(Continued)

(56) References Cited

U.S. PATENT DOCUMENTS

| 7,813,993 | B1 * | 10/2010 | Barto | ..................... G06Q 40/00 |
| | | | | 705/37 |
| 2014/0198974 | A1 * | 7/2014 | Takagi | .................. G06T 7/0008 |
| | | | | 382/149 |

(Continued)

FOREIGN PATENT DOCUMENTS

| DE | 4112881 C2 * | 11/1995 | ....... G05B 19/41865 |
| EP | 1386201 A2 | 2/2004 | |

OTHER PUBLICATIONS

European Patent Office, Extended European Search Report in corresponding European Application No. 21182442.0, dated Dec. 6, 2021 (8 pages).

*Primary Examiner* — Thomas C Lee
*Assistant Examiner* — Michael Tang
(74) *Attorney, Agent, or Firm* — Leydig, Voit & Mayer, Ltd.

(57) ABSTRACT

A manufacturing facility and a manufacturing method are provided herein to manufacture a product according to a specification in a digital manufacturing order. Manufacturing system units to be used are automatically scheduled (S2) and controlled (S3). While performing the manufacturing method, it is determined (S4) whether inspection data for a production result meet assessment criteria. Upon determining that a production result does not meet an assessment criterion, a derived manufacturing order is generated that specifies which production step(s) need to be repeated to obtain a production result that is more likely to meet the assessment criterion. The scheduling is updated in accordance with the derived manufacturing order and optionally newly received manufacturing orders resulting in a continuous manufacturing process.

20 Claims, 9 Drawing Sheets

(58) Field of Classification Search
USPC .......................................................... 700/104
See application file for complete search history.

(56) References Cited

U.S. PATENT DOCUMENTS

| | | | |
|---|---|---|---|
| 2018/0032065 A1* | 2/2018 | Delgado Arana | ............................ G05B 19/41865 |
| 2018/0341248 A1 | 11/2018 | Mehr et al. | |
| 2020/0160424 A1* | 5/2020 | Page | ................... G06Q 30/0621 |
| 2020/0233392 A1* | 7/2020 | Jonas | ...................... G01B 21/04 |
| 2021/0031440 A1* | 2/2021 | Leonards | ............... B33Y 30/00 |
| 2021/0263505 A1* | 8/2021 | Zheng | .................... G06N 3/086 |

\* cited by examiner

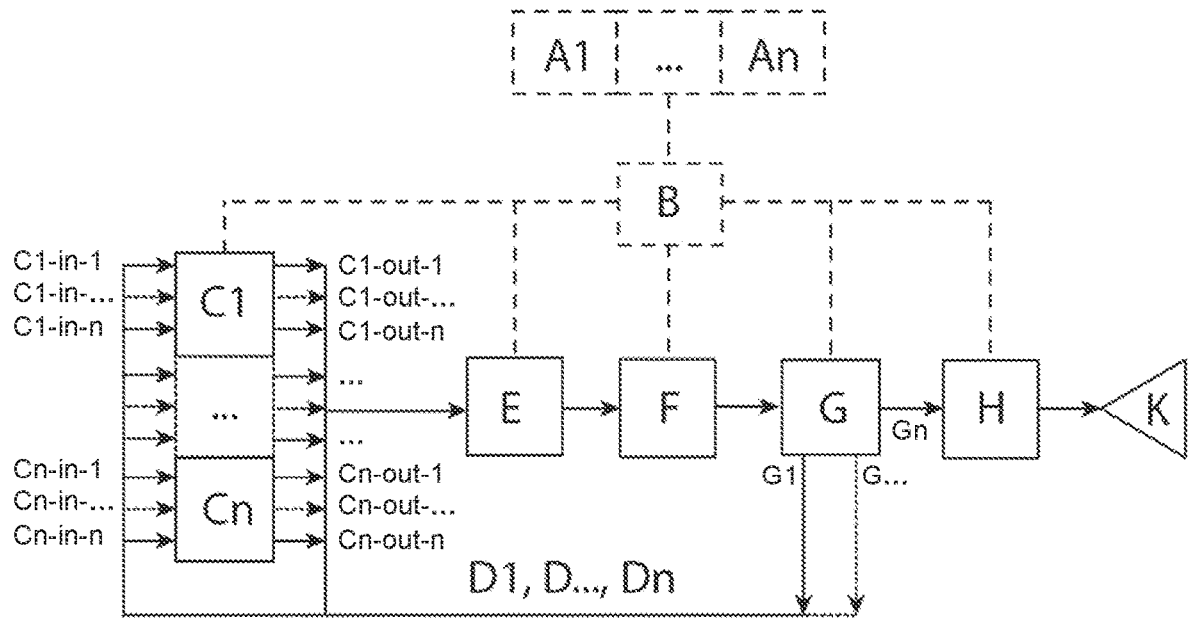

A1, A..., An = orders
B = control unit
C1, C..., Cn = manufacturing system units
Ci-in-1, Ci-in-..., Ci-in-n = input loading bays of manufacturing system unit i
Ci-out-1, Ci-out-..., Ci-out-n = output loading bays of manufacturing system unit i
D1, D..., Dn = routing system units
E = unbatching unit
F = inspection unit
G = sorting unit
G1, G..., Gn = sorting bins
H = packaging unit
K = shipping station
---------- digital data flow
=========> physical objects flow

FIG. 2

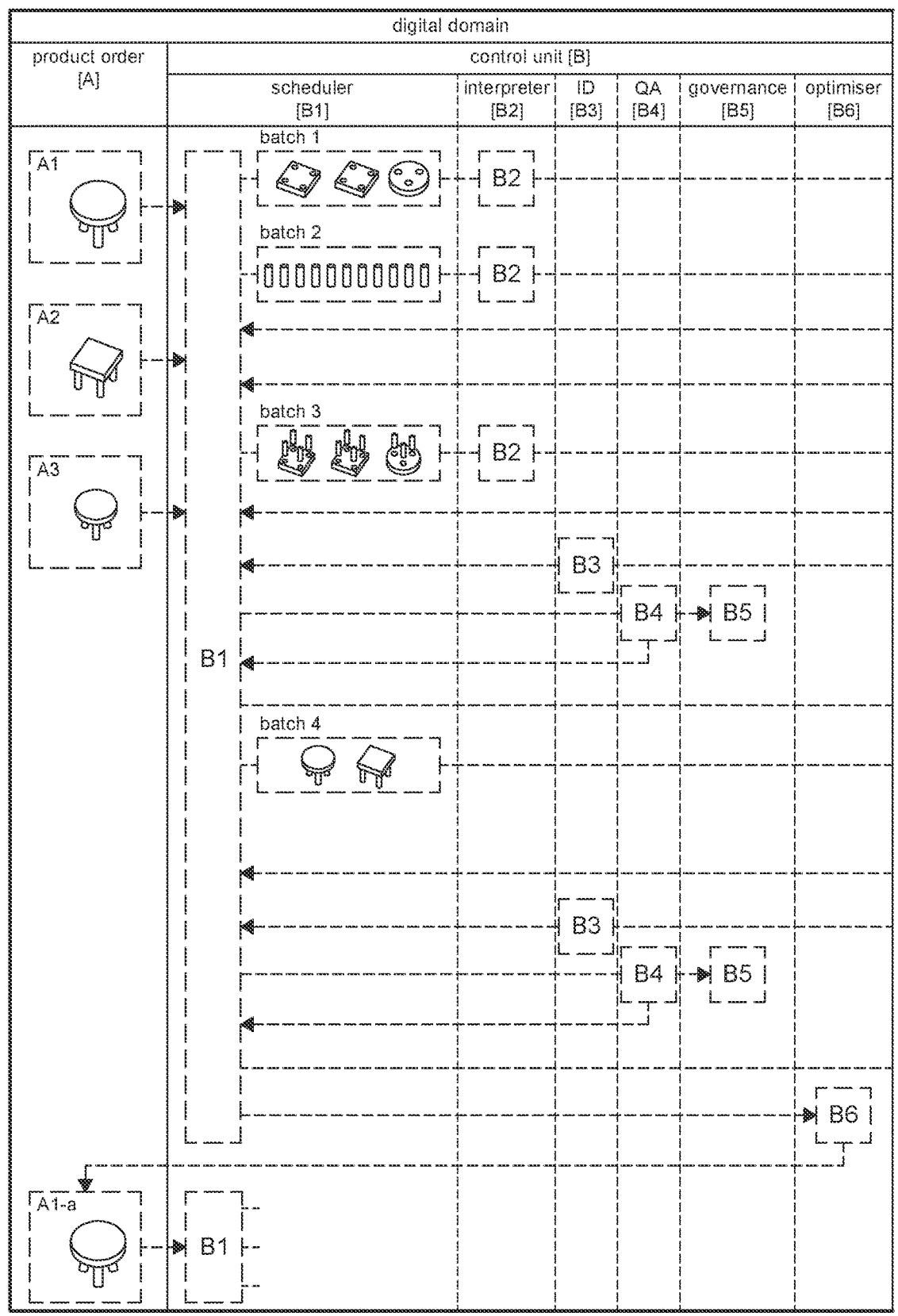
FIG. 3 (1-2)

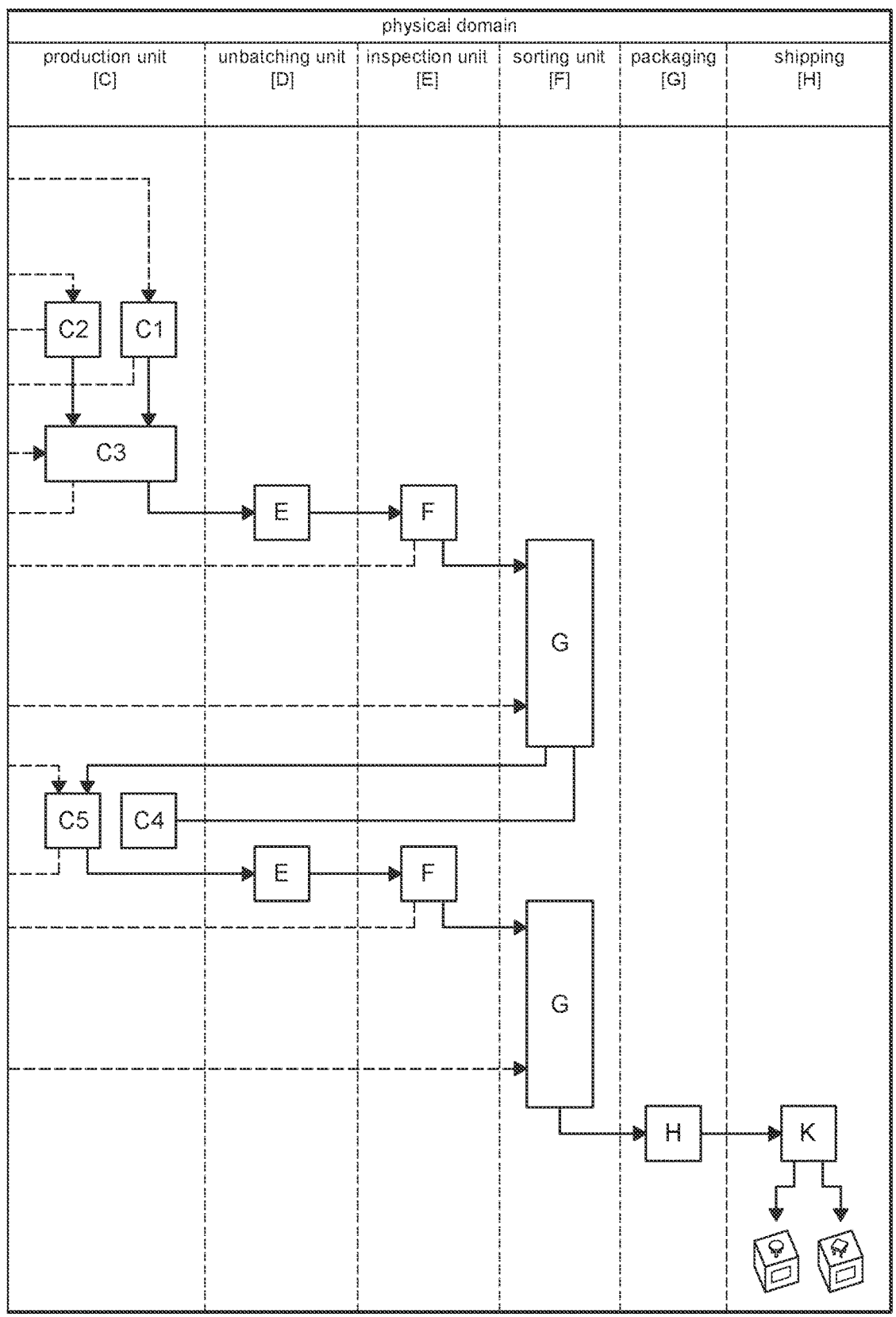
FIG. 3 (2-2)

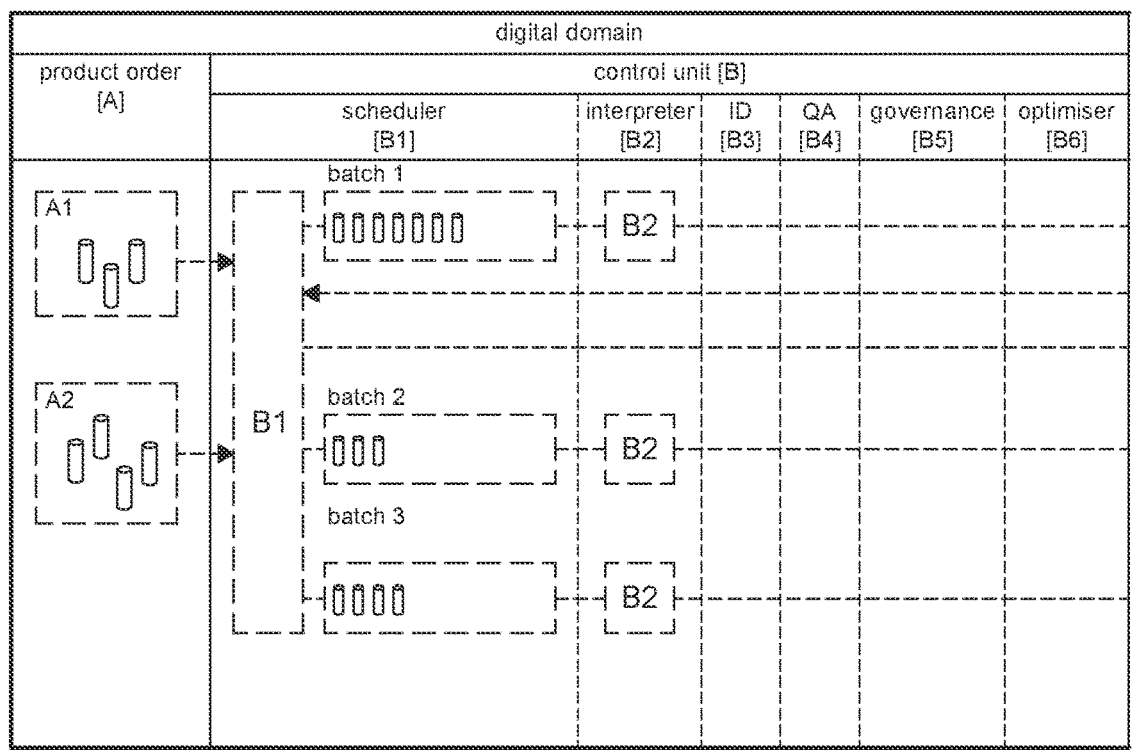
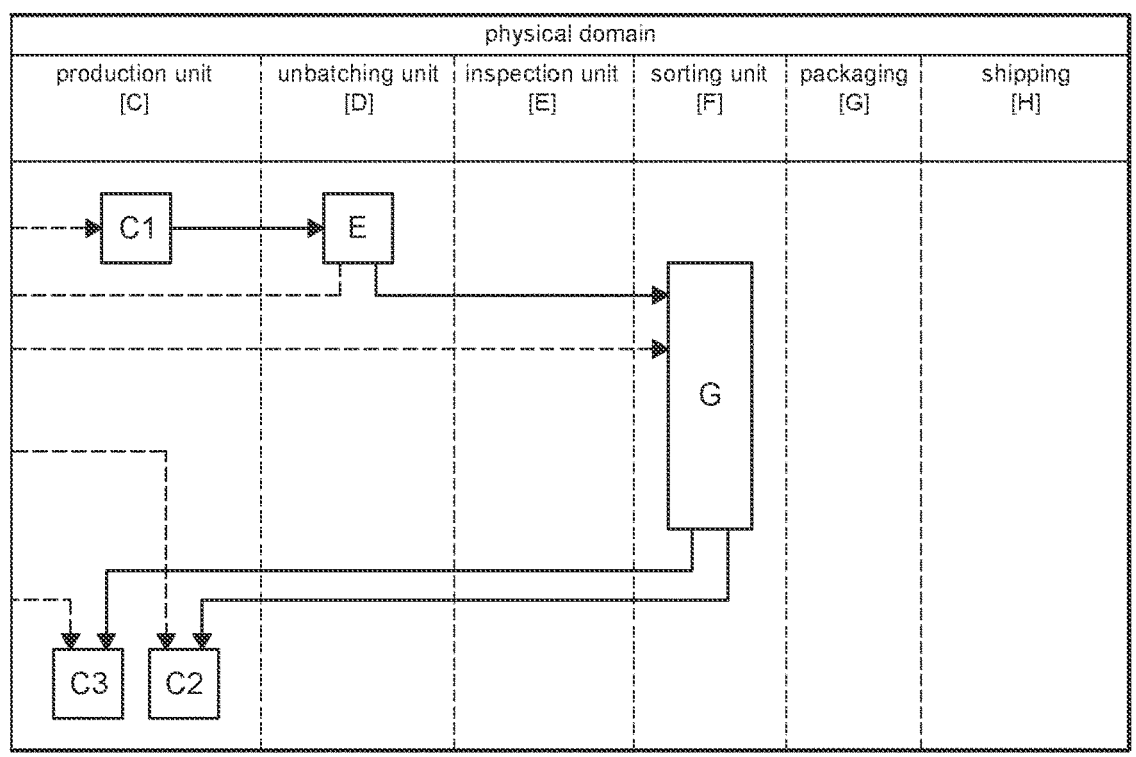
FIG. 4A

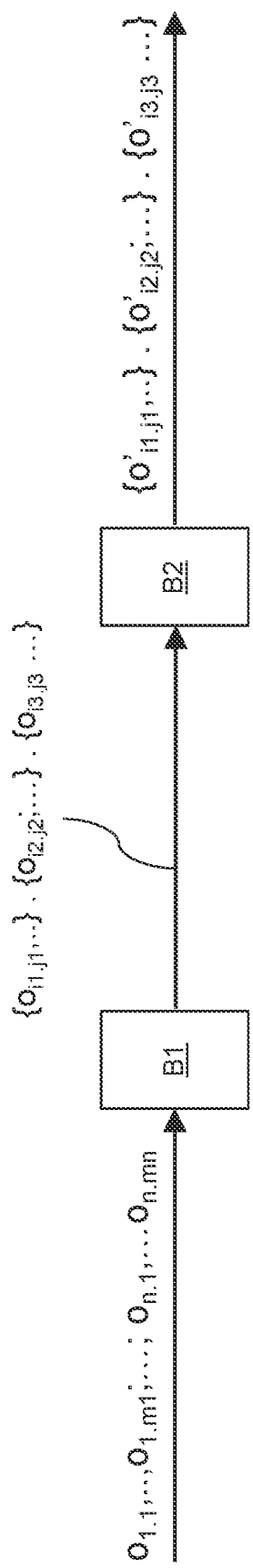
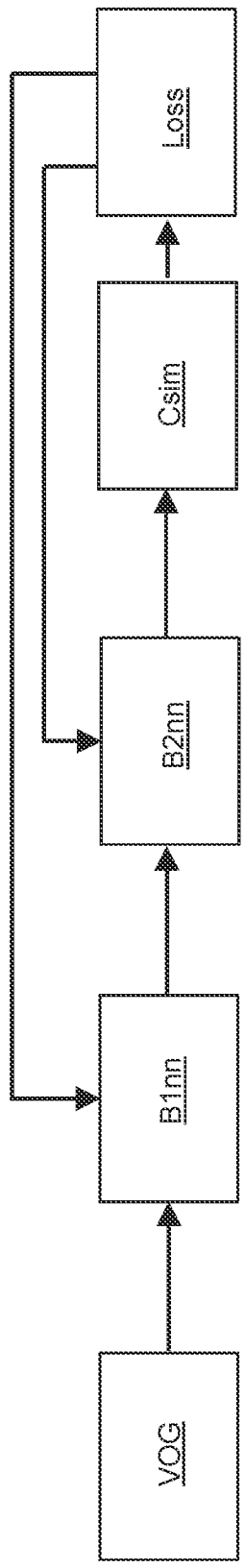
FIG. 7A
FIG. 7B

MANUFACTURING FACILITY AND MANUFACTURING METHOD

CROSS-REFERENCE TO RELATED APPLICATIONS

This patent application claims priority to European Application No. 21182442.0, filed Jun. 29, 2021, the contents of which are expressly incorporated by reference in their entirety, including any references contained therein.

TECHNICAL FIELD

The current disclosure is directed to manufacturing facilities. More particularly, the disclosure is directed to manufacturing facilities for manufacturing products according to a digital manufacturing order.

BACKGROUND

Requirements for modern production processes are that products can be manufactured at high production rates and with a high versatility to optimally meet customer requirements.

WO 2021/010833 discloses a manufacturing facility that aims to optimally address these requirements. The manufacturing facility comprises a manufacturing system with various batch production units that are capable to perform a common production process for a plurality of mutually different products. Examples thereof are an additive manufacturing unit such as a 3D-print unit, a dying unit, a tumble polishing unit or an organic growth unit. For example a batch comprising a plurality, e.g. thousands, of mutually different 3D objects may be produced by means of an additive manufacturing or 3D printing processes in a single so-called powder-tray. Typically the batch of products is de-powdered resulting in an unordered set of unlabeled objects. Also other manufacturing system units may deliver their products or semi-finished products in an unordered manner. According to the cited patent publication the products in the batch are identified for further handling thereof on an individual basis, e.g. labeling and/or packaging. With this combination of manufacturing system units the known manufacturing facility enables mass production of a variety of products as specified by customers at the same time. The identification may further comprise a quality inspection and handling may comprise a rejection of the product if it does not meet quality requirements. Therewith it is avoided that customers receive non-compliant products.

As becomes apparent from the above, the manufacturing process of a product typically involves various production stages comprising for example 3D-printing, dying, assembling, polishing and the like. Upon performing a manufacturing process for a product for the first time, it is more likely that the product does not meet specified requirements, resulting in a high rejection rate and an overall reduction of manufacturing efficiency. There is a need to address this disadvantage.

SUMMARY

In accordance with a first aspect of this disclosure, an improved manufacturing facility is provided.

In accordance with a second aspect of this disclosure, an improved manufacturing method is provided.

The improved manufacturing facility comprises a control system and a manufacturing system with a plurality of manufacturing system units controlled by the control system according to a digital manufacturing order comprising a specification of a product to be manufactured.

In operation the control system receives the digital manufacturing order and configures the manufacturing system to manufacture the product in accordance with the specification in the digital manufacturing order.

For that purpose the control system comprises a scheduler to schedule operation of production units and other manufacturing system units and an interpreter to prepare instructions for the scheduled manufacturing system units in a computer numerical control (CNC) programming language, such as G-code (also RS-274). The G-code instructions or other type of CNC instructions are provided to a machine controller (industrial computer) of the corresponding scheduled manufacturing system unit.

In accordance with the prepared instructions, each production unit performs a respective production step of the production process to provide a respective production result. For example, in a CNC-controlled machine tool such as a lathe or mill, a cutting tool is moved according to these instructions through a toolpath, therewith cutting away material to leave only the finished workpiece and/or, an unfinished workpiece is precisely positioned in any of up to nine axes [1] around the three dimensions relative to a toolpath and, either or both can move relative to each other. The same concept also extends to noncutting tools such as forming or burnishing tools, photoplotting, additive methods such as 3D printing, and measuring instruments. In some cases manufacturing system units may be controlled with high level control instructions that are further interpreted by the machine controller.

The product result may be a semi-finished product, the final product as specified or a batch of (semi-finished) products. Other system units support the production units for example by performing a scheduled routing of a product result, a scheduled unbatching of a batch type product result, a scheduled labeling and/or packaging of a product result.

The control system comprises an optimizer that is configured to obtain an assessment about a production result from an automated inspection process Upon obtaining an assessment that indicates that a production result does not meet an assessment criterion the optimizer determines which production step(s) need to be repeated to improve the production result. In accordance therewith the control system reconfigures the manufacturing system so as to repeat the one or more of the respective production steps involved in manufacturing the product as specified. Therewith the scheduler reschedules operation of manufacturing system units and the interpreter prepares appropriate instructions for the rescheduled manufacturing system units. By this reconfiguration the manufacturing system can rapidly proceed with the process of manufacturing the products as requested. The production result that is assessed may be a single (intermediate- or end-) product or a batch of (intermediate- or end-) products. Repeating a production step may be performed by a same production unit that initially performed that production step, but it may alternatively be another compatible production unit.

In a first example, the manufacturing system is reconfigured to reassemble a production result from its constituent parts.

In a second example the manufacturing system is reconfigured to repeat a post-processing step, e.g. coating, polishing of a production result.

In an embodiment the scheduler is configured further to reschedule operation of production units and other manufacturing system units upon receipt of a new digital manufacturing order. In this embodiment the scheduler handles the new order in substantially the same manner as requests received from the optimizer to repeat one or more of the respective production steps involved in manufacturing the product that was already being manufactured. Therewith the manufacturing process can be performed in a fully continuous manner.

In an embodiment the optimizer is configured to provide an optimized specification of the product based on the specification in the digital manufacturing order and the assessment of the production result and the manufacturing system is reconfigured to repeat all steps of the production process involved in manufacturing the product in accordance with the optimized specification of the product. In an example of this embodiment the manufacturing system is reconfigured to extract raw material from the production result for which it was indicated that it did not meet the assessment criterion. The raw material can be reused for manufacturing of new products. Hence, even if the product result needs to be completely rejected, a loss of material is at least substantially mitigated.

In some circumstances, it may be the case that the obtained assessment does not provide sufficient information to determine whether or not a production result meets an assessment criterion. In one example the control system is configured to give the production result the benefit of the doubt and to refrain from reconfiguring the manufacturing system, or it may always reconfigure the manufacturing system to repeat all proceeding production steps performed so far. In one embodiment, the control system is configured to request a new assessment about the production result from the automated inspection process. Therewith the automated inspection process is preferably modified, for example by using additional or different sensors.

In some embodiments inspection is scheduled subsequent to each production step. This is advantageous in that upon determining that a production step renders a non-compliant production result, it is not necessary to waste time in performing subsequent production steps to the non-compliant production result. Alternatively, if an inspection is scheduled after a sequence of production steps, this is advantageous that the time spent for inspection is reduced.

In some embodiments the scheduler comprises an inspection schedule module that is configured to optimize the scheduling of inspections so as to minimize a total amount of time involved in manufacturing a product including the time involved in performing inspections. In an example of such embodiments, the inspection schedule module is a trained machine learning module, such as a neural network. The trained machine learning module is obtained by training a machine learning module with training samples comprising for each training sample an indication indicating to which extent a production result of a manufacturing device meets an assessment criterion and an indication of production circumstances. Based on this training data, the machine learning module (MLM) is trained to recognize under which circumstances non-compliancy of the production result of a manufacturing system unit (MSU) is likely to occur according schedule the inspection. The indication of production circumstances for example include an identification of the manufacturing device, a size of the product, material used for the product. The indication indicating to which extent a production result of a manufacturing device meets an assessment criterion may be a binary indicator specifying whether or not the assessment criterion is met, but may alternatively be a more fine-grained indicator.

Typically, a manufacturing order includes a product description that specifies the manufacturing tools to be used and the processing steps to be performed therewith. This information directly enables the scheduler to adapt the scheduling to enable the manufacturing system to manufacture the product specified in the manufacturing order.

In an embodiment, the control system includes a reconstruction unit configured to reconstruct a 3D-model from image data of a product and to provide a specification of the 3D-model to the scheduler. An exemplary method for use by the reconstruction unit is known from US2003197699. In an example of this embodiment, the scheduler uses this information to schedule a 3D-printing system to print the product or objects from which it is to be assembled and instruct the interpreter to generate the corresponding control data for the 3D-printing system.

In another example of this embodiment, the scheduler uses this information to schedule a CNC-milling machine to manufacture an object from a plate of material and instruct the interpreter to generate the control data for the 3D-printing system based on the specification of the model. In some examples the reconstruction unit identifies the product as an assembly of parts, and the scheduler accordingly schedules a one or more production units, such as a 3D-printer or a CNC-milling device to produce the parts and an assembly unit to assemble the parts. It further instructs the interpreter to generate the control data for the one or more production units and the assembly unit.

In some cases, the manufacturing order received from a customer may be incomplete. In an embodiment, the control system comprises a manufacturing order completion unit. In one example thereof, the manufacturing order completion unit determines which information is lacking and automatically issues an inquiry with the customer. In another example, the manufacturing order completion unit uses prior information to complete the order. In some cases the manufacturing order completion unit partly complete the order in as far as possible with prior information and request the customer to supply the remaining necessary information.

An improved method comprises the following steps:
a) receiving the digital manufacturing order;
b) determining manufacturing system units to be used in a process of manufacturing the specified products from supplied materials, the manufacturing system units comprising at least a production unit to produce production results, at least a routing units to route a production results or a supplied materials and at least an inspection units to inspect a production result;
c) scheduling the manufacturing system units to be used, therewith allocating said manufacturing system units to specific time-slots for said process, said scheduling comprising:
c1) scheduling the at least a production unit to provide a production result required to manufacture the ordered product;
c2) scheduling the at least an inspection unit to inspect a production result;
c3) scheduling the at least a routing unit to transport a production results or a supplied material to the at least a scheduled production unit or to the at least an inspection unit;
d) preparing control data for the scheduled manufacturing system units;
e) determining whether inspection data provided by the inspection unit for a production result meets assessment criteria;

f) upon determining that a production result does not meet an assessment criterion specifying in a derived manufacturing order which production step(s) need to be repeated to obtain a production result that is more likely to meet the assessment criterion;

g) in case a derived manufacturing order is specified proceeding with the step c) of scheduling the derived manufacturing order and the subsequent steps.

In an embodiment of the manufacturing method, the at least one production unit comprises a batch production unit, and scheduling the batch production unit comprises allocating the batch production unit in respective specific time-slots to perform respective batch processes as part of a production process of a particular product.

In an embodiment of the manufacturing method, the at least one production unit comprises a batch production unit and a sorting unit, and scheduling comprises scheduling the sorting unit to sort a production result from the batch production unit into individual products or classes of individual products.

In an embodiment of the manufacturing method, scheduling comprises scheduling the at least one inspection unit so as to minimize a total amount of time involved in manufacturing a product including the time involved in performing inspections.

BRIEF DESCRIPTION OF THE DRAWINGS

These and other aspects are shown in more detail with reference to the drawings therein.

FIG. 2 is a functional representation of a fully automatic digital manufacturing facility;

FIG. 3 shows an overview of various steps and components involved in the processing of carrying out a digital manufacturing order;

FIG. 4A, 4B shows respective operations of the control system;

FIG. 7A shows another aspect of the control system;

FIG. 7B shows an associated machine learning process.

DETAILED DESCRIPTION OF EMBODIMENTS

Figure 1:
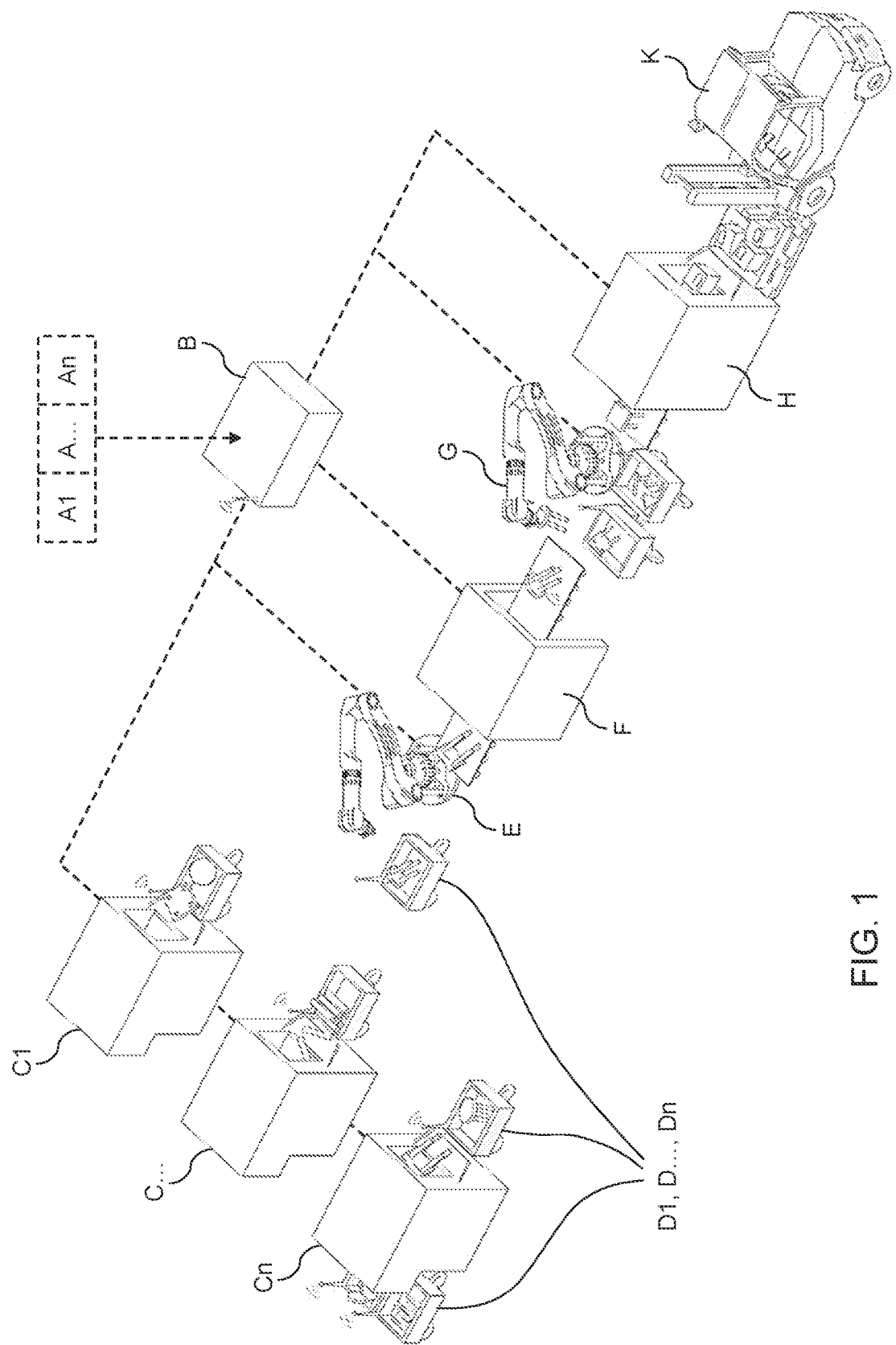
FIG. 1 is a perspective view of a fully automatic digital manufacturing facility.

FIG. 1 shows a perspective view of an exemplary manufacturing facility that comprises a control system (B) and a manufacturing system with a plurality of manufacturing system units (C1, . . . ,Cn, D1, . . . ,Dm, E,F,G,H,K) controlled by the control system according to a digital manufacturing order (A1, . . . ,Ap) comprising a specification of a product to be manufactured.

Figure 4B:
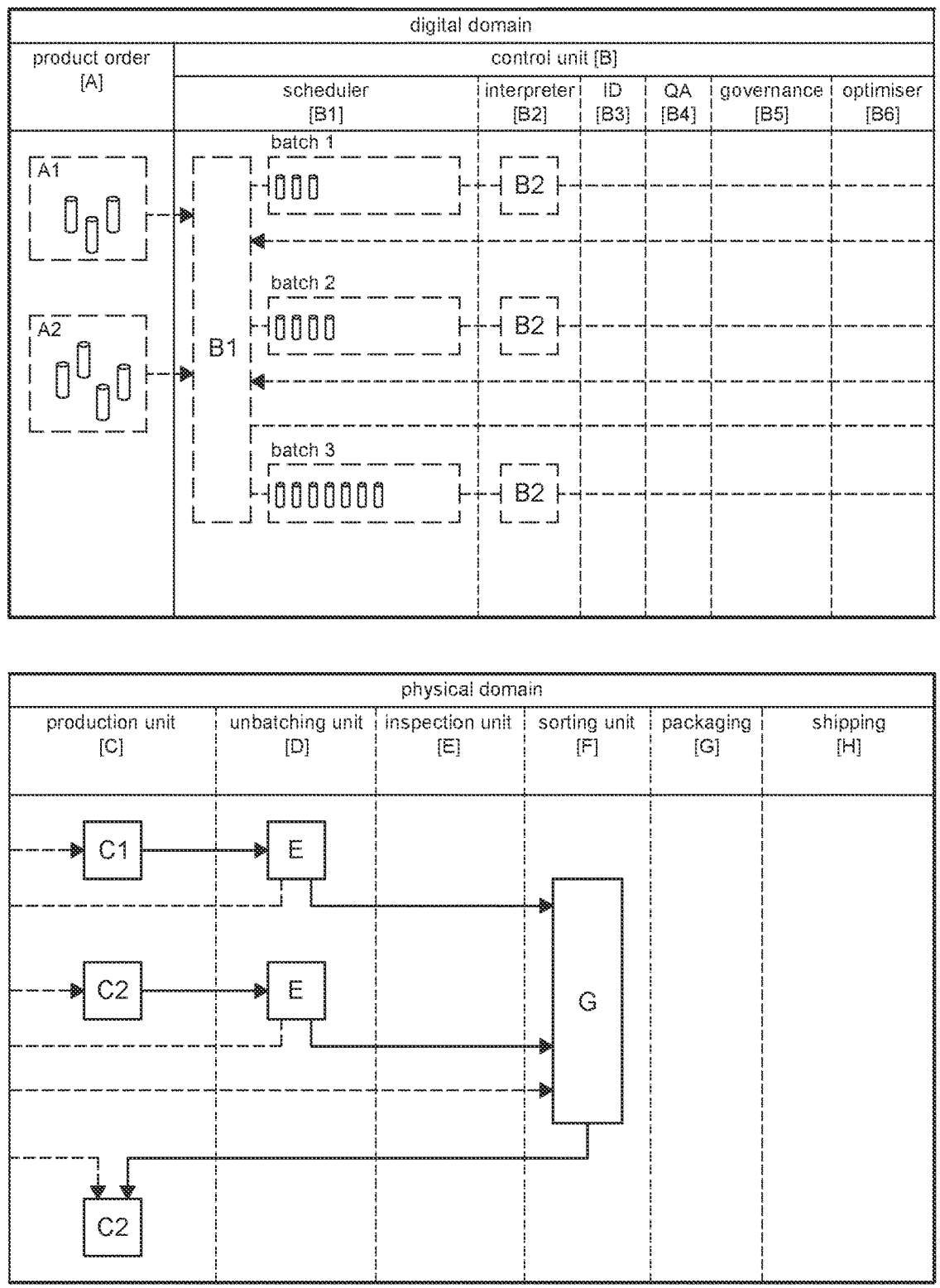

In operation, the control system B receives the digital manufacturing order(s) A1, . . . ,Ap. As shown in more detail in FIG. 4a, 4b, the control system B comprises a scheduler B1 and an interpreter B2 to configure the manufacturing system to perform a production process to manufacture the product in accordance with the specification in the digital manufacturing order. The scheduler B1 is provided to schedule operation of production units C1, . . . ,Cn and other manufacturing system units E,F,G,H,K and the interpreter B2 is provided to prepare instructions for the scheduled manufacturing system units. As specified in more detail below, each of the scheduled production units is to perform a respective production step of the production process to provide a respective production result, and the other manufacturing system units support the production process.

The control system B further comprises optimizer B6 that is configured to obtain an assessment about a production result from an automated inspection process F. Upon obtaining an assessment that indicates that a production result does not meet an assessment criterion the optimizer determines which production step(s) need to be repeated to improve the production result. The control system B then reconfigures the manufacturing system so as to repeat the one or more of the respective production steps involved in manufacturing the product as specified. The scheduler B1 accordingly reschedules operation of manufacturing system units and the interpreter B2 prepares appropriate instructions for the rescheduled manufacturing system units. Aspects of the manufacturing facility are now presented in further detail.

Manufacturing Orders A1, A . . . , An

The production cycle starts with digital manufacturing orders being sent to the control system B. A digital manufacturing order may consist of one or more of the following fields, P.O. number, customer info, product specification and status history as specified in more detail in ANNEX 1.

Control System B

Figure 6:
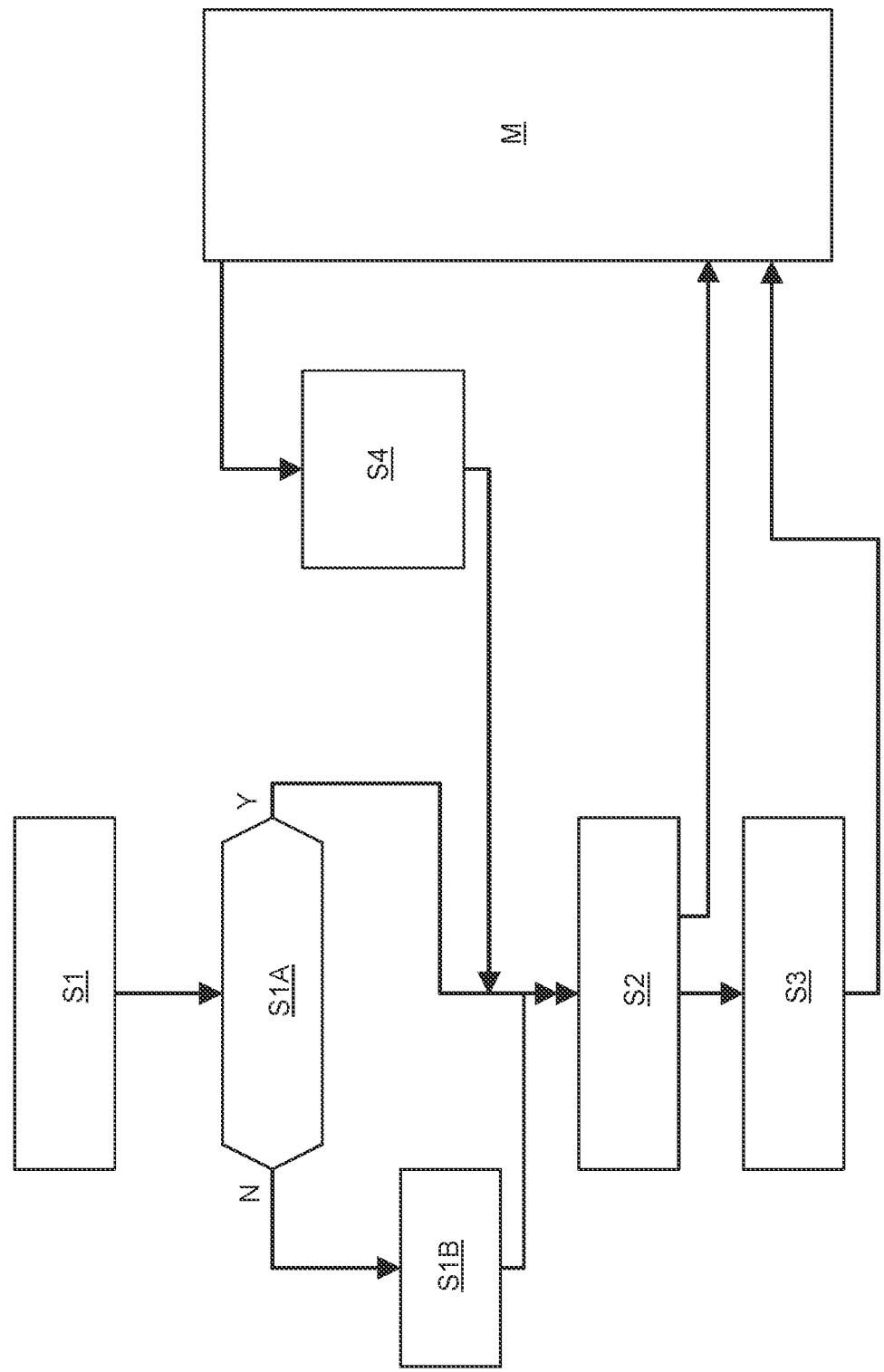
FIG. 6 shows an embodiment of a method of manufacturing disclosed herein.

As specified above the control system comprises control system elements including a scheduler B1, an interpreter B2 and an optimizer (See also step S4 in FIG. 6). Control system elements may be provided as dedicated hardware, a suitably programmed general purpose processing device or a combination thereof. One or more control system elements may be combined. Alternatively a functionality of a control system element may be performed by distributed devices. The role of various control system elements is now specified in more detail.

Scheduler B1

The scheduler acts like an Enterprise Resource Planning (ERP) system and dynamically creates, merges and splits batches of parts to be manufactured based on the manufacturing requirements specified in the digital manufacturing orders. Typically the digital manufacturing order specifies the ordered product in terms of its parts and the production units to produce the parts and assembly instructions to assemble the product from the produced parts. The scheduler accordingly schedules timeslots wherein the production units and assembly units are assigned for performing the production steps with which the ordered product is to be manufactured. The scheduler also schedules additional manufacturing system units, such as routing units for routing the production results, sorting units for sorting production results of a batch into individual production results or classes of production results. The scheduler also schedules inspection units to perform inspections on the production results.

The scheduler further provides instructions to the interpreter to prepare control data for the scheduled manufacturing system units.

In some cases the digital manufacturing order lacks specific information about the production units required to manufacture the ordered product. In that case the scheduler may schedule one or more production units and instruct the interpreter to generate the control data for those production units. As an example, the scheduler may schedule a CNC-milling device or a 3D-printer to manufacture a 3D-product having known dimensions.

Batch production processes can be performed for multiple species of a same ordered product. In practice, the scheduler may receive a plurality of orders for mutually different products and the scheduler is capable to merge processes for mutually different products in a common batch and/or to split processes for a particular product into a plurality of batches where necessary so as to so as to optimize the lead-time and quality with which the manufacturing orders are carried out. Operational example of the scheduler are described in more detail with reference to FIG. 4a, 4b, which respectively demonstrate splitting and merging batches. In accordance therewith, in case of a batch process, the scheduler prepares instructions for the interpreter by combining the manufacturing instructions for the products in a common batch. In case of a production process to be applied to a single product, it suffices that the scheduler provides the corresponding instructions in the manufacturing order for that product to the interpreter.

In accordance with the schedule prepared by the scheduler and the control data prepared by the interpreter, the manufacturing system starts manufacturing the ordered product. While the manufacturing system is operational to manufacture one or more products according to the schedule, the scheduled one or more inspection units inspect the production results. Based on inspection data from the inspection unit(s), the optimizer B6 determines whether the inspected production results meet appropriate assessment criteria. Upon determining that this is not the case, the optimizer prepares a derived manufacturing order that specifies which productions step(s) are required to obtain a replacement production result that is likely to meet the assessment criteria. The optimizer submits the derived manufacturing order to the scheduler, so that the scheduler can schedule the required manufacturing system units and appropriately instruct the interpreter. In an embodiment, the scheduler continuously updates the schedule on the basis of newly received manufacturing orders and derived manufacturing orders generated by the optimizer.

Interpreter B2

Figure 5:
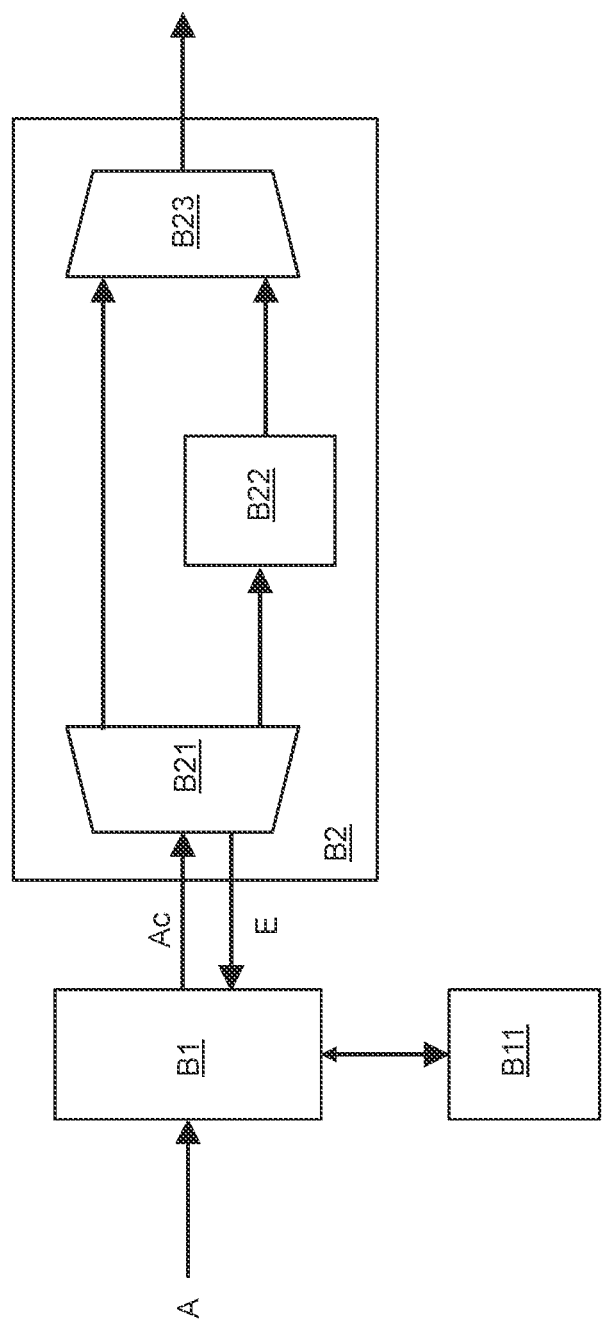
FIG. 5 shows an aspect of the control system.

As mentioned above, the interpreter B2 transforms the instructions A1 obtained from the scheduler B1 into a format that is specific to the designated manufacturing system unit C. An exemplary embodiment of the interpreter B2 and its functional relationship to the scheduler B1 is shown in FIG. 5. Therein sub-unit B21 identifies a type of instruction obtained from the scheduler B1 and to internally redirect the instruction, sub-unit B22 is a computational unit and sub-unit B23 is an output unit that is configured to submit the generated control data to a particular manufacturing unit.

In case the manufacturing order specifies a respective GCODE for the product to be manufactured the interpreter is configured to pass this code directly via sub-unit B11 and sub-unit B13 to the scheduled manufacturing system unit. Otherwise, sub-unit B11 redirects the instruction from the scheduler B1 to the computational unit B22. In an example, the digital manufacturing order comprises a DSL that describes the geometry of the ordered product in a parameterized manner. In an embodiment the computational unit B22 is configured to map a photograph or a series of photographs to a 3D volume as described in "US20030197699A1, Three-dimensional reconstruction method utilizing reprojective optimization". In still further embodiments the interpreter comprises a neural network that is trained to perform a mapping from a DSL into a specification of the intended geometry. In an embodiment a neural network is trained for this purpose by supplying training data samples comprising a pair of training input data and training output data. Therein the training input data comprises a general description of a product to be manufactured and circumstantial information about the customer, such as shapes observed in window sills on Google's StreetView with the client's zip-code area, and/or data found on the client's public social media profiles, and the training output data comprises a detailed specification of the product to be manufactured. Therewith the neural network is trained to render a detailed specification on the basis of similar input data. For example, in case the ordered product is merely specified as 'teacup' the neural network will derive the geometry of a 3D teacup in the style most likely corresponding to the client's taste determined on the basis of the circumstantial information about the customer. In those cases wherein the interpreter B2 is not capable to interpret an instruction Ac from the scheduler B1, it communicates this to the scheduler with an error signal E. In response thereto the scheduler B1 is configured to activate a manufacturing order completion module B11 that is configured to request additional information from the customer. The scheduler B1 subsequently retransmits the completed digital manufacturing order to the interpreter B2.

Identification Unit B3

As objects flow in batches through the manufacturing system often the link between the physical object and its corresponding specification in the provided in the digital manufacturing order is lost. In order to perform quality assessment and dispatch the objects to manufacturing system units C downstream, the objects must be matched to their corresponding manufacturing order A originally received by the control unit B. Patent application PCT/NL2020/050467 describes such a system in which physical 3D objects that have a digital representation can be matched to a digital description and of which the quality can then be assessed by means of scanning the object using any means of automatic visual or other inspection.

Quality Assessment Unit B4

The QA unit validates data from the inspection unit F against the criteria specified in the quality assessment criteria of the object specification in the manufacturing order A. Upon request the QA unit returns a distance metric for each of the assessment criteria to said data, together with a Boolean value resulting from the comparison against a threshold value for said assessment criterion indicating whether the QA is passed or not.

Governance Unit B5

The governance unit tracks the progress of the manufacturing process of the product and their parts specified in a manufacturing orders, and records the relevant information, e.g. it may notify an external ERP system of the quality assessment results, and it may record the (hash of the) combined data from the inspection unit F, the result of the assessment of the QA unit B4 and the configuration settings and control parameters of the used manufacturing units onto a ledger for example using the VeChain blockchain in order for objectively trusted supply chain tracking to occur.

Optimizer B6

The optimizer is configured to issue a new manufacturing order A1-a to take the place of a previous manufacturing order A1 that resulted in a manufactured object, i.e. a product or a part thereof that did not pass the Quality Assessment of the QA unit B4. Based on the combination of the product specifications in the previous manufacturing order A1 and the data from the inspection unit F the optimizer determines which adjustments need to be made to the manufacturing order A1 in order to improve the manufactured object in the sense that it is more likely to pass the QA. This adjustment may be relatively straightforward such as automatically increasing the overall wall-thickness using existing software solutions such as NETFABB or BLENDER or an extra post-processing step such as polishing is added to the new manufacturing order A1-a.

More complex adjustments may be realized by direct adjustment of the parameterization of the object description of the manufacturing order, based on simulation of the product manufacturing process. In an example each manufacturing system unit C provides a method to simulate its operation and production results in silico based on the manufacturing instructions provided by the interpreter B2. Therewith the optimizer is enabled to simulate the entire manufacturing process using a simulated version of the inspection unit F, and perform an entirely virtual Quality Assessment of the new manufacturing order. Based on this virtual QA it can be determined whether it is more likely that the product produced using the new manufacturing order will pass the QA and if so, the new manufacturing order Al-a may be issued, replacing the previous manufacturing order A1. This iterative adjustment initiates an evolutionary series of products that may lead to a final product that passes the Quality Assessment.

Note that the configuration of the optimizer may itself be subject to machine learning methods, based on learnings from prior QA failures and data augmentations that were successful.

Manufacturing System Units C1, . . . , Cn

Any number of manufacturing units may be employed to automatically manufacture, assemble or post-process the one or more parts described in the data received from the control unit B. At least three types of manufacturing units may be discerned:
  A production unit that produces objects from raw materials such as a 3D printer.
  A post-process unit that performs additional actions on one or more parts so as to improve quality. An example is a tumbling-polisher that puts all the objects from one batch together in a large container filled with ceramic beads and then shakes the entire container so as to polish the surface of the objects.
  An assembly unit combines objects to form a new object with possibly new functional properties. An example is a unit that takes as an input two batches of objects, and glues pairs of these objects together based on the location of certain markers on their surface using a robotic arm manipulator.

Crucially, these manufacturing units may be batching units meaning that they may process any number of objects without keeping track of the location of the objects during the process, e.g. an industrial SLS printer typically prints many objects in a large bin containing the powder-like material that is to be sintered, with the objects placed as close together as possible so as to reduce material waste and optimize production time. Similarly, a CNC milling machine may produce many different shapes from plate material and then collect the shapes without tracking the location of the produced parts. Likewise a dyeing post-processing unit may apply paint to the objects in a similar manner, filling the container with paint and then shaking the entire contraption. The manufacturing units then place the produced parts in an attached dispatch bay from where they may be transported to another unit depending on the batch routing information.

A manufacturing system unit has one or more input loading bays and one or more output loading bays connected to the routing system units D, the number of input- and output loading bays depending on the functionality of the manufacturing system unit. In a not limiting example, the loading bays are implemented as docks for containers coupled to a robotic arm manipulator to load objects from the containers in- and out of the manufacturing system units.

The loading bays of the i'th manufacturing system unit Ci-in-1, Ci-in . . . , Ci-in-n and Ci-out-1, Ci-out . . . , Ci-out-n may have three possible states:
  'unavailable' meaning that there is no routing system unit D connected to the loading bay and the manufacturing system unit must halt loading to or from the bay.
  'available' meaning that there is a routing system unit D connected to the loading bay and the manufacturing system unit can continue loading to or from the bay.
  'capacity' meaning that there is a routing system unit connected to the loading bay, but that the objects in the batch at the bay are used up (for input bays) or that no more objects can be loaded into the bay (for output bays).

In general, a manufacturing system unit is any device or system of devices capable of performing a specific set of actions onto a specific set of input objects resulting in a predictable set of objects at a specific set of outputs.

Routing System Units D1, D . . . , Dn

The routing system units connect the loading bays of the manufacturing system units. The units may be implemented as mobile robots relaying containers to and from the manufacturing system units' input and output loading bays and are to be controlled by the control system B in particular by the scheduler B1.

Unbatching Unit E

The unbatching unit receives at its single input loading bay a batch of (untracked) finished objects from any of the output loading bays of the manufacturing system units, or from any other unit such as the sorting unit G and provides a layout of the objects that allows further units to process the objects on an individual basis in a so-called one-piece-flow (i.e. unbatched). A general implementation of such a unit employs a picking robot that uses an electronic vision system that is configured to detect parts of the objects in the offered batch so that it can grab each single object one by one and place it on a conveyor belt that transports it to the next unit.

Inspection Unit F

The inspection unit is configured to receive objects in a one-piece-flow at its single input loading bay that are untracked in the sense that the correspondence with the manufacturing order A has been lost due to batch processing at any of the batch processing units. The data from the inspection unit may be used by the identification unit B3 and the Quality Assessment unit B4 of the control system B to identify the object and match it with the corresponding manufacturing order and to assess its quality.

The inspection unit may comprise one or more data gathering units including but not limited to:
  a 2D image scanning unit (f.i. RGB camera)
  a 3D surface scanning unit (f.i. Time of Flight camera, structured light projection, laser-triangulation)
  a 3D volume scanning unit (f.i. Ultrasound scanning, x-ray, CAT scanning)
  a tensile strength testing unit
  a compression strength testing unit
  a colorimetric testing unit
  mechatronics testing unit In some examples an inspection unit is alternatively or additionally configured to scan a batch of objects at a time. For example the inspection unit is configured to provide an overall indication of a material quality of objects in the batch using an X-ray scan.

Sorting Unit G

A sorting unit redirects objects presented at its single input loading bay into any number of output loading bays G1, G . . . , G . . . which may then feed the objects back to any of the batch post-processing units as determined by the control unit B, or it may redirect the object to a packaging.

Packaging Unit H

A packaging unit places the object into a suitable container and labels the container with the shipment information. The containers may then be collected for shipment.

EXAMPLES

Consider a fully automated manufacturing facility that may consist of a number of manufacturing system units C1, C . . . , Cn that manufacture, post-processes or assemble objects. Each i'th manufacturing system unit Ci has one or more input loading bays Ci-in-1, Ci-in . . . , Ci-in-n and output loading bays Ci-out-1, Ci-out . . . , Ci-out-n where batches of one or more objects are loaded in or out of the unit. The loading mechanism is specific to each manufacturing system unit. For instance a tumbling polishing machine may employ a straightforward dumping mechanism where the entire batch is thrown in- and out of the tumbler device. As another example, the illustrated assembly unit Cn in FIG. 1 may implement the input loading mechanism(s) as a one-piece-flow enabling unit that aligns the objects for further assembly.

Exemplary manufacturing system units may be as complex as a fully automated PCB etching machine, where the inputs are the raw materials for the PCBs, the layouts of the circuits with their components and the firmware for the ICs on the PCBs, and the output is the finished PCBs with the firmware loaded. Further assembly-type manufacturing units may then be employed to place the PCBs into mechatronic devices that were produced on other manufacturing system units. Tests may then be performed on the entire integrated system, using the mechatronics unit of the inspection unit F and if the subsequent QA B4 fails, the control system B employs the optimizer B6 to then adjust the firmware and employ the scheduler B1 to route the product so as to augment it with the new firmware, or manufacture an entirely new instance of the product with the new firmware and recycle the failed product, until the augmented or new product matches the quality criteria specified in the digital product order A and the product can finally be sent to packaging H and shipment K.

The manufacturing system units C are connected by the routing system D. The routing system is illustrated in FIG. 1 as a number of freely directable mobile robots D1, D . . . , Dn that can load and offload batches of objects into and out of input- and output loading bays.

The manufacturing facility further comprises an unbatching unit E, which is implemented in the example shown as a picking robot that places objects offered by the routing system at its single input loading bay onto a conveyor belt that runs into the inspection unit F that scans and possibly tests the objects physically and sends its data to the control system B. The objects are then transported to the sorting unit G which is configured by the control unit B to sort the objects in their corresponding output loading bays G1, G . . . , Gn for further processing by the manufacturing units, or to be transported to the packaging and shipping units H, K.

FIG. 2 and FIG. 3 show by way of an illustrative example a manufacturing facility for stools. The fully automated facility can manufacture customized stools of any shape and with any number of legs, in any color. In this example, a manufacturing system unit C1 is a CNC milling machine, capable of manufacturing stool seats in any shape with any number of holes. Unit C1 has one input bay C1-in-1 that loads large plates into the machine from which the smaller shapes are then milled. The seats that are milled by the CNC milling machine are then collected and placed into the output loading bay C1-out-1.

Manufacturing system unit C2 is a CNC-lathe machine that is configured to produce any number of legs from wooden poles offered at its input bay (not shown in FIG. 2).

Manufacturing system unit C3 is an assembly unit that takes the stool legs produced by unit C2 and the seats produced by unit C1 offered at its two input loading bays and automatically fits the wooden pegs manufactured by C2 into the holes in the seats produced by C1. Note that the manufacturing system units C1 and C2 could be any other type of machine such as a 3D printer or any other CNC device capable of automatically manufacturing the specified parts.

To further illustrate the manufacturing facility, reference is now made to FIG. 3. FIG. 3 shows an example wherein three digital manufacturing orders A1,A2,A3 for three different stools are received. Therein A1 is an order for a stool with three legs, in order A2 a painted square stool is specified with four legs and order A3 requests a stool with the configuration as specified by order A1 but being painted in the same color as specified in order A2. The orders A1, A2, A3 are sent to the control system, specifically to the scheduler B1 which determines which parts of the manufacturing order should be performed by which manufacturing system unit. The scheduler B1 schedules a batchwise processing of these parts so as to optimize parallel manufacturing and balance the load on the manufacturing system units. For each batch respective instructions are sent to the interpreter B2 that, in accordance with these instructions generates a command sequence for the designated manufacturing unit.

In a similar fashion, once the output loading bay of manufacturing unit C2 is full i.e. it is in 'capacity' state, the batch is directed to the second input of unit C3 and the output bay of unit C2 is once again moved to 'available' state. If assembly unit C3 cannot fit the pieces together it may be configured to pass the objects directly to its output bay to be filtered out by the QA unit B4 of the control system B further downstream, or it may be configured to reject the objects at the input bay and notify the control system B. The batch at the output bay of assembly unit C3 is transported to the 'unbatching' unit E. This 'unbatching unit' can be implemented as a picking robot that grabs the individual items in the offered batch and places them on a conveyor belt, so as to create a one-piece-flow of separated, individual items. This one-piece-flow of individual products is then transported f.i. by means of a conveyor belt to an inspection unit F. The inspection unit F collects data on the state of the product. This data may f.i. be a (series of) digital photograph(s) under controlled lighting, a point-cloud obtained by laser-triangulation of the object or by means of structured light scanning techniques, but it may also be data representing the physical strength of the object obtained by performing a physical test, f.i. a stress test by pressing downward on the seat of the stool with a known force and measuring the deformation of the object directly caused by said force. This data is sent to the identification unit B3 and Quality Assessment (QA) unit B4. The identification unit B4 is configured to match a product order A to the given inspection data, and once it finds a match with a predetermined confidence, the Quality Assessment (QA) unit B4 performs a QA. A sorting unit G receiving the inspected and quality assessed object is then configured by the control system B to send the object to the appropriate manufacturing system unit for further processing via the appropriate output loading bay. If the identification unit B4 cannot match the object to a manufacturing order A, the object can be moved to one of the other output loading bays of the sorting bay G where it is to be transported back to the 'unbatching' unit E, so that the identification may be attempted a second time. If the object is still not matched to a manufacturing order after a configurable number of attempts, the object may be sent to a disposal- or recycling bay, or buffered in a storage facility. Note that when a manufacturing order A is not being fulfilled, an attempt may be made to match the manufacturing order to the stored inspection data of objects that were not matched with any manufacturing order. A match may then be found more easily albeit with lower confidence because there are now fewer datasets left to test against. If a match can still not be found, another attempt at manufacturing the product order may be made, until the produced object is identified and the manufacturing order can be fulfilled.

Once the identification unit B3 has identified an object and matched the object to the corresponding manufacturing order A, a QA is performed by the QA unit B4 comparing the data from the testing unit F to the assessment criteria specified in the manufacturing order. In some examples, the control system B is configured to request more detailed data from the inspection unit F in order to perform the QA. In that is the case it schedules a rerouting of the object to make another pass through the inspection unit F.

If the QA passes, the governance unit B5 is notified which may then register the successful assessment together with the original inspection data and manufacturing system unit configuration settings and control parameters on a public ledger using blockchain technology, for instance but not limited to the 'VeChain' distributed ledger that is specifically designed for supply chain governance. The scheduling unit B1 then configures the sorting unit G to pass the object towards the packaging unit H for automatic packaging and labelling, which then passes it to the terminal shipping unit K of the manufacturing facility.

If the QA is not passed however, the governance unit B5 is also notified and the optimizer B6 of the control system B may be requested to issue a new manufacturing order and modify the object description in the original manufacturing order in such a way that a newly manufactured object with the augmented object description has a higher likelihood of passing the QA.

In the routing example of FIG. 3, the product resulting from the first manufacturing order A1 fails the QA and is sent to the disposal manufacturing system unit C4, which in some examples is configured to recycle the materials of the product for further use. The optimizer B6 then issues a new, modified manufacturing order A1-a that is modified so as to increase the likelihood that the resulting object passes the QA. Consider for example that the QA unit B5 has measured the deformation caused by a physical stress test performed on the seat of the stool to exceed the assessment criteria specified in the production order A1 and therefore rejected the QA. The optimizer may use this data to strengthen the stool by adjusting the thickness of the three legs, and issue a new production order with the adjusted design. In another example, the optimizer B6 determines that it suffices to repeat a post-processing and in that case the optimizer B6 issues a derived manufacturing order to the scheduler B1. In response thereto the scheduler B1 schedules the post-processing unit, the interpreter provides the control commands for the post-processing unit and in the scheduled timeslot the post-processing unit repeats the post-processing operation to the previously non-compliant production result. In again another example, the optimizer B6 determines that a production result is improperly assembled. In that example the optimizer B6 issues a derived manufacturing order to the scheduler B1 to subsequently schedule a de-assembly operation to the improperly assembled product and a re-assembly operation of a new production result from the parts obtained in the re-assembly operation. In response thereto the scheduler B1 schedules a de-assemble unit and a re-assemble unit, the interpreter provides the control commands for the de-assemble unit and the re-assemble unit and in the respective scheduled timeslots the de-assemble unit and the re-assemble unit subsequently perform their operations to obtain a newly assemble production result.

If the alternative manufacturing order(s) spawned by the optimizer B6 are not clearly more likely to pass the QA or lead to ambiguous product descriptions, and if the manufacturing order specifies that the user be informed of QA failure, the control unit may inform the user and provide the user with the possibility of issuing any of the alternative manufacturing orders. The control system B may use this information to train a Machine Learning algorithm to optimize its optimizer to perform better in similar situations.

FIG. 6 schematically shows an embodiment of a method of manufacturing products as specified in a digital manufacturing order.

In step S1, a digital manufacturing order is received.

Presuming that the digital manufacturing order is complete, it is determined in step S2 which manufacturing system units are to be used in a process of manufacturing the specified products from supplied materials. The manufacturing system units to be used at least comprise a production unit to produce production results, a routing unit to route production results and/or supplied materials and an inspection unit to inspect a production result. Furthermore, in step S2 the manufacturing system units to be used are scheduled, therewith the manufacturing system units to be used are schedule for specific time-slots, therewith taking into account already existing schedules for previously received manufacturing orders. The step of scheduling comprises the following sub-steps:

1) scheduling one or more production unit to provide a respective production result required to manufacture the ordered product;
2) scheduling one or more inspection units to inspect production results;
3) scheduling one or more routing units to transport production results or a supplied material to a scheduled production unit or to an inspection unit.

In step S3 control data is prepared for controlling the scheduled manufacturing system units. This step may be performed directly after the moment of scheduling manufacturing system units, but may alternatively be performed later provided that this does not delay the actual manufacturing process as scheduled.

The allocation data prepared in step S2 and the control data prepared in step S3 configure the manufacturing system M to manufacture the ordered products.

In the course of manufacturing the ordered product as scheduled in step S2 and according to the control data prepared in step S3, it is determined in step S4 whether inspection data provided by the inspection unit for a production result meets assessment criteria. Upon determining that a production result does not meet an assessment criterion furthermore a derived manufacturing order is generated in step S4. The derived manufacturing order specifies which production step(s) need to be repeated to obtain a production result that is more likely to meet the assessment criterion.

In case a derived manufacturing order is specified, control proceeds with step S2 in order to schedule the derived manufacturing order, taking into account pending allocations for currently handled manufacturing orders, for example manufacturing orders that were recently received. Then the procedure continues as indicated above with step S3. In this way a fully continuous manufacturing process is realized that is adapted to handle an inflow of new manufacturing orders and deviations to a schedule, for example due to non-qualified production result.

FIG. 6 shows the following optional steps. In a step S1A it is verified whether or not the digitally received manufacturing order is complete. If this is the case (Y) the procedure continues with step S2 as described above. If this is not the case, the procedure continues with step S1B wherein the missing information is obtained for example by requesting the information from the customer and/or by reconstructing the missing information using other data sources.

In performing step S2, the scheduler may employ several optimization techniques that are concerned with QA rejection prevention and lead-time reduction and that are well known in the art of ERP systems design. Some specific optimizations that are relevant for the present application such as the precise timing of the inspection- and QA steps in the manufacturing route are described below.

Consider a batch of parts that undergo a series of consecutive post-processing steps at subsequent manufacturing units C, f.i. sanding C1, painting C2 and polishing C3 and inspection data is collected at an inspection unit F followed by a quality assessment B4 of said data. This sequence of steps may be encoded with the following expression:

[1] B4(F(C3(C2(C1(batch)))))

The total time $T_1$ involved in the ideal case that all assessment criteria are directly met is:

$$T_1 = T_{C1} + T_{C2} + T_{C3} + T_F + T_{B4}$$

Therein the index indicates the time involved in the respective manufacturing system units. I.e. $T_{C1}$, $T_{C2}$, $T_{C3}$ are the production times for the manufacturing units C1, C2 and C3, $T_F$ is the time required by the inspection unit F to perform the inspection and $T_{B4}$ is the time involved in performing the quality assessment based on the inspection result.

In practice, production results may not always meet the assessment criteria.

The expected fraction $s_1$ of qualified product results obtained in a single pass can be expressed as:

$$s_1 = s_{C1} \cdot s_{C2} \cdot s_{C3}$$

Wherein $s_{C1}$, $s_{C2}$, $s_{C3}$ respectively are the expected fraction of qualified product results in the batch.

Accordingly, a fraction $s_1$ of the production results will be obtained in a single pass, a fraction $s_1(1-s_1)$ in two passes and a fraction $s_1(1-s_1)^n$ in n+1 passes.

Therewith the expected process time $T_{1e}$ for the first configuration is determined by:

$$T_{1e} = \frac{T_1}{s_1} = \frac{T_{C1} + T_{C2} + T_{C3} + T_F + T_{B4}}{s_{C1} \cdot s_{C2} \cdot s_{C3}}$$

If the QA unit B4 determines that the assessment criteria provided in the batch description are not met, the whole batch fails and the steps taken by the manufacturing system units C1, C2, C3 were for naught. However, it may have been the case that the fault leading to the assessment rejection occurred early on in the manufacturing process, say, at C1. In order to prevent this wasteful cycle, first an extra QA step is placed after each manufacturing unit output, encoded in the expression:

[2] B4(F(C3(B4(F(C2(B4(F(C1(batch)))))))))

In this configuration, in the ideal case that no failures occur, presuming that the inspection time $T_F$ and the assessment time $T_{B4}$ for each process step is the same for each case, the total production time $T_2$ is:

$$T_2 = (T_{C1} + T_F + T_{B4}) + (T_{C2}T_{C2} + T_F + T_{B4}) + (T_{C3}T_3 + T_F + T_{B4})$$

The expected process time $Te_e$ in this case is:

$$T_{2e} = \frac{(T_{C1} + T_F + T_{B4})}{s_1} + \frac{(T_{C2} + T_F + T_{B4})}{s_2} + \frac{(T_{C3} + T_F + T_{B4})}{s_3}$$

Initially this is a costly operation because the inspection and QA needs to be done three times instead of once. However, the information gathered in this way may be used to train the scheduler B1 so that the inspection and QA is done only at points in the manufacturing route where errors are most likely to occur.

In the following example it is presumed that the scheduler has learned that the sanding step at C1 causes problems, but that the painting step at C2 is reliable. In this example an inspection is scheduled subsequent to the first production step C1 and subsequent to the last production step (C3). This scheduling is schematically expressed as:

[3] B4(F(C3(C2(B4(F(C1(batch)))))))  In the absence of failures, the total process time T3 is:

$$T_3 = (T_{C1} + T_F + T_{B4}) + (T_{C2} + T_{C3} + T_F + T_{B4})$$ And the expected process time $Ta_{3e}$ is:

$$T_{3e} = \frac{(T_{C1} + T_F + T_{B4})}{s_1} + \frac{(T_{C2} + T_{C3} + T_F + T_{B4})}{s_2 \cdot s_3}$$

The inspection scheduler of the scheduler determines the estimated optimum manufacturing configuration that minimizes the expected process time based on information about the success rates of the various production steps. In some cases, where the success rate of the production steps is relatively high it is likely that the inspection scheduler only schedules an inspection to be performed on the end product as in configuration [1]. However, if in practice the success rate is lower, the inspection scheduler may schedule a configuration with more inspection steps, as in example [2] or [3].

Hence, the expression [3] may encode the more efficient manufacturing route, because defects are caught early and the batch may be rejected early, preventing the second and third steps to occur even though expression [1] is shorter and therefore appears to be more efficient.

In these examples, it is presumed that the time involved in transporting the production results is negligible. In practice the actual transport time may be included in determining the optimal schedule.

The scheduler may employ a second quality directed optimization technique specific to Additive Manufacturing to prevent deformations of the 3D printed objects. For example in a Selective Laser Sintering (SLS) 3D printing method, the heat distribution in the powdered influences the solidification process. As many objects may be printed in one large powder bed tray, this heat differential may cause deformations in the objects as they cool down inside the tray. Hence, the distribution and orientation of objects in the tray matters for the QA, and the scheduler B1 together with the interpreter B2 of the control system may take this into account when determining which objects are batched together and which are placed together in the powder bed tray.

A third optimization technique to be performed by the scheduler, which is also specific to Additive Manufacturing, may be employed to prevent what may be called 'synchronizing maximum lead-times' aims to balance manufacturing times for objects that are in one batch. For example during a 3D printing process where many objects are manufactured in the same powder bed tray, a large object from one manufacturing order A1 may take hours to print, yet a small object from another manufacturing order A2 may require only minutes to print. If the objects are placed together in one batch, the lead-time of the second manufacturing order A2 unnecessarily becomes as long as the lead-time of the first manufacturing order A1. This problem also occurs when objects are not properly aligned in the powder bed tray.

Consider for example two identical elongated parts (e.g. two stool legs in the example facility in FIG. 1.) of two different manufacturing orders A1, A2 that are batched together by the scheduler B1 of the control system B and the scheduler B1 subsequently instructs the interpreter B2 of the control system B to provide control data with which an SLS 3D printing manufacturing unit C1 produces the parts combined in the batch. Various options are possible to achieve this. According to one option the interpreter B2 provides control data that cause the SLS 3D printing manufacturing unit C1 to render the batch with one leg arranged in a vertical direction and the other leg in a horizontal direction. As a consequence, the leg placed vertically takes much longer to print and the lead-times for both manufacturing orders A1, A2 synchronize to the maximum of the two. A substantial improvement is obtained when the interpreter controls the SLS 3D printing manufacturing unit C1 to render the batch with all legs arranged in a horizontal direction.

This is a very extreme case, in which the more optimal arrangement of objects in the batch to be printed can be readily determined. In practice a plurality of mutually different objects may be 3D-printed in a batch and the overall production time depends on the distribution of the height of the objects to be printed, and how efficient the plurality of objects fits into a tray. Furthermore quality requirements may need to be taken into account. The more general case is shown in FIG. 7A. As shown therein, the scheduler B1 receives part specifications $o_{1.1}, \ldots, o_{1.m1}; \ldots; o_{n.1}, \ldots, o_{n.mn}$, wherein parts $o_{n.1}, \ldots, o_{n.mn}$ are those specified in manufacturing order An for example. The scheduler B1 schedules batches { } in which the parts are to be manufactured, in the drawing schematically indicated as $\{o_{i1,j1}, \ldots\} \{o_{i1,j2}; \ldots\}, \{o_{i3,j3}. \ldots\}$ and correspondingly instructs the interpreter B2 to provide control data to the 3D printer to print the objects in an optimal orientation and mutual arrangement that minimizes the overall production time and maximizes quality. In FIG. 7A the control data for the 3D-printer is schematically indicated as $\{o'_{i1,j1}\}, \{o'_{i2,j2}; \ldots\}, \{o'_{i3,j3}. \ldots\}$.

As schematically shown in FIG. 7B, a machine learning approach may be used to train the scheduler B1 and the interpreter B2 in order to optimize the batch selection process and the process of generating manufacturing control data for the manufacturing system unit so as to optimize for highest quality and smallest lead-times. Therein a virtual order generator VOG is used that generates virtual orders for products with respective parts. A first neural network B1nn to be trained as a scheduler B1 provides for a tentative scheduling of the various parts to be manufactured in batches, and a second neural network B2nn, to be trained as an interpreter provides tentative control data specifying according to which orientation and in which mutual arrangement the objects specified for the batch are to be printed by a 3D printer to produce the parts in a batch. In this arrangement the 3D-printer is replaced with a simulator Csim with which the expected production time and expected quality of the products that would be obtained with a physical 3D-printer is estimated. Output data of the simulator Csim is inspected to compute a loss function based on requirements for production time and quality. The outputs of the loss function are used for training the first neural network B1nn and B2nn. As the 3D printer is replaced by a simulator Csim, a fast training process is possible. The training examples to be provided by the virtual order generator VOG may include examples of previous orders and the loss function may be based on actual achieved production time and quality achieved with manually prepared batches and manually prepared arrangements of objects within a batch. The first neural network B1nn may alternatively or additionally be trained with training examples comprising a combination of orders and using a loss function that is indicative for a difference between a tentative batch proposal provided by the first neural network B1nn and the batch proposal that actually was manually prepared. Similarly, the second neural network B2nn may alternatively or additionally be trained with training examples specifying a combination of parts in a batch and using a loss function that is indicative for a difference between a tentative proposal for the orientation and mutual arrangement of objects to be printed provided by the second neural network B2nn and the corresponding manually prepared proposal.

ANNEX 1
Detailed contents of digital manufacturing order

| DMO main field | sub field 1 | sub field 2 |
| --- | --- | --- |
| PO nr | | |
| Customer Info | Name | |
| | Address | |
| | Email | |
| | Phone | |
| | Notify on QA failure | |
| Product specification | Part list: each | Geometry description |
| | | Number of copies |
| | | Quality assessment criteria |
| | | Manufacturing requirements |
| | | Post processing steps |
| | Assembly instructions | Post processing steps per assembly |
| | | Quality criteria per assembly |
| Status History | Blockchain Address | |
| | Production Status | |
| | QA Results | |

What is claimed is:

1. A manufacturing facility comprising:
   a control system; and
   a manufacturing system comprising a plurality of manufacturing system units controlled by the control system according to a digital manufacturing order comprising a specification of a product to be manufactured, wherein the control system is configured to receive the digital manufacturing order and comprises a scheduler and an interpreter to configure the manufacturing system to perform a production process to manufacture the product in accordance with the specification in the digital manufacturing order, wherein the scheduler is configured to schedule operation of production units and other manufacturing system units, wherein the interpreter is configured to prepare instructions for the scheduled manufacturing system units, wherein each of the scheduled production units is configured to perform a respective production step of the production process to provide a respective production result, wherein at least one production unit is a batch production unit, and wherein scheduling the batch production unit comprises allocating the batch production unit in specific time-slots to perform a common batch process as part of a production process of mutually different products, wherein the control system further comprises an optimizer that is configured to obtain an assessment about a production result from an automated inspection process, wherein, upon obtaining an assessment that indicates that a production result does not meet an assessment criterion, the optimizer specifies, in a derived manufacturing order, production step(s) that need to be repeated to improve the production result, such that the control system performs reconfiguring of the manufacturing system so as to repeat one or more of the respective production steps involved in manufacturing the product as specified, wherein the scheduler, in accordance with the reconfiguring, reschedules operation of manufacturing system units and the interpreter prepares appropriate instructions for the rescheduled manufacturing system units, wherein the optimizer is configured to provide an optimized specification of the product that differs from the specification in the digital manufacturing order and is based on the specification in the digital manufacturing order and the assessment of the production result, and wherein the control system is configured to reconfigure the manufacturing system to repeat all steps of the production process involved in manufacturing the product in accordance with the optimized specification of the product.

2. The manufacturing facility according to claim 1, wherein the control system is configured to reconfigure the manufacturing system to reassemble a production result from constituent parts of the production result.

3. The manufacturing facility according to claim 1, wherein the control system is configured to reconfigure the manufacturing system to repeat a post-processing step.

4. The manufacturing facility according to claim 1, wherein the scheduler is further configured to reschedule operation of production units and other manufacturing system units upon receipt of a new digital manufacturing order.

5. The manufacturing facility according to claim 1, wherein the control system is configured to reconfigure the manufacturing system to extract raw material from the production result for which the production result was indicated as not meeting the assessment criterion.

6. The manufacturing facility according to claim 1, wherein the control system is configured to reconfigure the manufacturing system to perform a new assessment about a production result for which a previous assessment is not decisive about whether the production result meets an assessment criterion.

7. The manufacturing facility according to claim 6, wherein the manufacturing system is reconfigured to perform the new assessment with a different inspection process.

8. The manufacturing facility according to claim 1, wherein the scheduler comprises an inspection schedule module that is configured to optimize the scheduling of inspections so as to minimize a total amount of time involved in manufacturing a product including the time involved in performing inspections.

9. The manufacturing facility according to claim 8, wherein the inspection schedule module comprises a trained machine learning module.

10. A method of manufacturing products as specified in a digital manufacturing order, the method comprising:
   a) receiving the digital manufacturing order;
   b) determining manufacturing system units to be used in a process of manufacturing the specified products from supplied materials, the manufacturing system units comprising at least:
      a production unit to produce a production result,
      a routing unit to route the production result or a supplied material, and
      an inspection unit to inspect a production result;
   c) scheduling the manufacturing system units to be used, therewith allocating the manufacturing system units to specific time-slots for the process, the scheduling comprising:
      c1) scheduling the production unit to provide a production result required to manufacture the ordered product;
      c2) scheduling the inspection unit to inspect a production result; and
      c3) scheduling the routing unit to transport the production result or the supplied material to the scheduled production unit or to the inspection unit;
   d) preparing control data for the scheduled manufacturing system units;
   e) determining whether inspection data provided by the inspection unit for a production result meets an assessment criterion;
   f) specifying in a derived manufacturing order, in accordance with determining that a production result does not meet an assessment criterion, production step(s) that need to be repeated to obtain a production result in accordance with the assessment criterion; and)
   g) proceeding, in case where a derived manufacturing order is specified, with the step c) of scheduling the derived manufacturing order and the subsequent steps, wherein at least one production unit is a batch production unit, wherein scheduling the batch production unit comprises allocating the batch production unit in a specific time-slot to perform a common batch process as part of a production process of mutually different products, wherein the method further comprises performing a neural network training procedure, preceding the step a) of receiving the digital manufacturing order, in which a neural network is trained by supplying training data samples comprising a pair of training input data and training output data, wherein the training input data comprises a general description of a product to be manufactured and circumstantial information about a customer, and wherein the training output data comprises a detailed specification of the product to be manufactured, therewith training the neural network to perform a mapping from circumstantial information about a customer and a general description of a product specified in a manufacturing order from a customer to a detailed specification of the intended geometry of the product.

11. The manufacturing method according to claim 10, further comprising a mapping step subsequent to the step of receiving from a customer the digital manufacturing order, wherein the digital manufacturing order comprises a general description of a product to be manufactured, and wherein the mapping step comprises with the neural network performing a mapping from circumstantial information about the customer and the general description of the product to a detailed specification of the intended geometry of the product and manufacturing the product in accordance with the detailed specification.

12. A manufacturing facility comprising:

a control system; and a manufacturing system comprising a plurality of manufacturing system units controlled by the control system according to a digital manufacturing order comprising a specification of a product to be manufactured, wherein the control system is configured to receive the digital manufacturing order and comprises a scheduler and an interpreter to configure the manufacturing system to perform a production process to manufacture the product in accordance with the specification in the digital manufacturing order, wherein the scheduler is configured to schedule operation of production units and other manufacturing system units, wherein the interpreter is configured to prepare instructions for the scheduled manufacturing system units, wherein each of the scheduled production units is configured to perform a respective production step of the production process to provide a respective production result, wherein at least one production unit is a batch production unit, and wherein scheduling the batch production unit comprises allocating the batch production unit in specific time-slots to perform a common batch process as part of a production process of mutually different products, wherein the control system further comprises an optimizer that is configured to obtain an assessment about a production result from an automated inspection process, wherein, upon obtaining an assessment that indicates that a production result does not meet an assessment criterion, the optimizer specifies, in a derived manufacturing order, production step(s) that need to be repeated to improve the production result, such that the control system performs reconfiguring of the manufacturing system so as to repeat one or more of the respective production steps involved in manufacturing the product as specified, wherein the scheduler, in accordance with the reconfiguring, reschedules operation of manufacturing system units and the interpreter prepares appropriate instructions for the rescheduled manufacturing system units, wherein the manufacturing facility is further configured to receive from a customer a manufacturing order that comprises a general description of a product to be manufactured, and wherein the interpreter comprises a neural network that is trained to perform a mapping from the general description of the product and circumstantial information about the customer into a detailed specification of the intended geometry of the product.

13. A manufacturing facility comprising:

a control system; and a manufacturing system comprising a plurality of manufacturing system units controlled by the control system according to a digital manufacturing order comprising a specification of a product to be manufactured, wherein the control system is configured to receive the digital manufacturing order and comprises a scheduler and an interpreter to configure the manufacturing system to perform a production process to manufacture the product in accordance with the specification in the digital manufacturing order, wherein the scheduler is configured to schedule operation of production units and other manufacturing system units, wherein the interpreter is configured to prepare instructions for the scheduled manufacturing system units, wherein each of the scheduled production units is configured to perform a respective production step of the production process to provide a respective production result, wherein at least one production unit is a batch production unit, and wherein scheduling the batch production unit comprises allocating the batch production unit in specific time-slots to perform a common batch process as part of a production process of mutually different products, wherein the control system further comprises an optimizer that is configured to obtain an assessment about a production result from an automated inspection process, wherein, upon obtaining an assessment that indicates that a production result does not meet an assessment criterion, the optimizer specifies, in a derived manufacturing order, production step(s) that need to be repeated to improve the production result, such that the control system performs reconfiguring of the manufacturing system so as to repeat one or more of the respective production steps involved in manufacturing the product as specified, wherein the scheduler, in accordance with the reconfiguring, reschedules operation of manufacturing system units and the interpreter prepares appropriate instructions for the rescheduled manufacturing system units, wherein the control system is configured to reconfigure the manufacturing system to reassemble a production result from constituent parts of the production result, wherein the optimizer is configured to provide an optimized specification of the product that differs from the specification in the digital manufacturing order and is based on the specification in the digital manufacturing order and the assessment of the production result, and wherein the control system is configured to reconfigure the manufacturing system to repeat all steps of the production process involved in manufacturing the product in accordance with the optimized specification of the product.

14. The manufacturing facility according to claim 13, wherein the control system is configured to reconfigure the manufacturing system to repeat a post-processing step.

15. The manufacturing facility according to claim 13, wherein the scheduler is further configured to reschedule operation of production units and other manufacturing system units upon receipt of a new digital manufacturing order.

16. The manufacturing facility according to claim 13, wherein the control system is configured to reconfigure the manufacturing system to perform a new assessment about a production result for which a previous assessment is not decisive about whether the production result meets an assessment criterion.

17. The manufacturing facility according to claim 16, wherein the manufacturing system is reconfigured to perform the new assessment with a different inspection process.

18. The manufacturing facility according to claim 13, wherein the scheduler comprises an inspection schedule module that is configured to optimize the scheduling of inspections so as to minimize a total amount of time involved in manufacturing a product including the time involved in performing inspections.

19. A manufacturing facility comprising:
a control system; and
a manufacturing system comprising a plurality of manufacturing system units controlled by the control system according to a digital manufacturing order comprising a specification of a product to be manufactured,
wherein the control system is configured to receive the digital manufacturing order and comprises a scheduler and an interpreter to configure the manufacturing system to perform a production process to manufacture the product in accordance with the specification in the digital manufacturing order,
wherein the scheduler is configured to schedule operation of production units and other manufacturing system units,
wherein the interpreter is configured to prepare instructions for the scheduled manufacturing system units,
wherein each of the scheduled production units is configured to perform a respective production step of the production process to provide a respective production result,
wherein at least one production unit is a batch production unit, and wherein scheduling the batch production unit comprises allocating the batch production unit in specific time-slots to perform a common batch process as part of a production process of mutually different products,
wherein the control system further comprises an optimizer that is configured to obtain an assessment about a production result from an automated inspection process,
wherein, upon obtaining an assessment that indicates that a production result does not meet an assessment criterion, the optimizer specifies, in a derived manufacturing order, production step(s) that need to be repeated to improve the production result, such that the control system performs reconfiguring of the manufacturing system so as to repeat one or more of the respective production steps involved in manufacturing the product as specified,
wherein the scheduler, in accordance with the reconfiguring, reschedules operation of manufacturing system units and the interpreter prepares appropriate instructions for the rescheduled manufacturing system units,
wherein the control system is configured to reconfigure the manufacturing system to repeat a post-processing step,
wherein the optimizer is configured to provide an optimized specification of the product that differs from the specification in the digital manufacturing order and is based on the specification in the digital manufacturing order and the assessment of the production result, and
wherein the control system is configured to reconfigure the manufacturing system to repeat all steps of the production process involved in manufacturing the product in accordance with the optimized specification of the product.

20. A manufacturing facility comprising:
a control system; and
a manufacturing system comprising a plurality of manufacturing system units controlled by the control system according to a digital manufacturing order comprising a specification of a product to be manufactured,
wherein the control system is configured to receive the digital manufacturing order and comprises a scheduler and an interpreter to configure the manufacturing system to perform a production process to manufacture the product in accordance with the specification in the digital manufacturing order,
wherein the scheduler is configured to schedule operation of production units and other manufacturing system units,
wherein the interpreter is configured to prepare instructions for the scheduled manufacturing system units,
wherein each of the scheduled production units is configured to perform a respective production step of the production process to provide a respective production result,
wherein at least one production unit is a batch production unit, and wherein scheduling the batch production unit comprises allocating the batch production unit in specific time-slots to perform a common batch process as part of a production process of mutually different products,
wherein the control system further comprises an optimizer that is configured to obtain an assessment about a production result from an automated inspection process,
wherein, upon obtaining an assessment that indicates that a production result does not meet an assessment criterion, the optimizer specifies, in a derived manufacturing order, production step(s) that need to be repeated to improve the production result, such that the control system performs reconfiguring of the manufacturing system so as to repeat one or more of the respective production steps involved in manufacturing the product as specified,
wherein the scheduler, in accordance with the reconfiguring, reschedules operation of manufacturing system units and the interpreter prepares appropriate instructions for the rescheduled manufacturing system units,
wherein the scheduler is further configured to reschedule operation of production units and other manufacturing system units upon receipt of a new digital manufacturing order,
wherein the optimizer is configured to provide an optimized specification of the product that differs from the specification in the digital manufacturing order and is based on the specification in the digital manufacturing order and the assessment of the production result, and wherein the control system is configured to reconfigure the manufacturing system to repeat all steps of the production process involved in manufacturing the product in accordance with the optimized specification of the product.

* * * * *